US011671655B2

(12) United States Patent
Franz et al.

(10) Patent No.: US 11,671,655 B2
(45) Date of Patent: *Jun. 6, 2023

(54) METADATA MANIPULATION

(71) Applicant: Comcast Cable Communications, LLC, Philadelphia, PA (US)

(72) Inventors: Joseph Franz, Mountain View, CA (US); Dhurv Garg, Austin, TX (US)

(73) Assignees: Comcast Cable Communications, LLC, Philadelphia, PA (US); NBCUniversal Media, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/536,614

(22) Filed: Nov. 29, 2021

(65) Prior Publication Data

US 2022/0086523 A1  Mar. 17, 2022

Related U.S. Application Data

(63) Continuation of application No. 16/913,529, filed on Jun. 26, 2020, now Pat. No. 11,218,766.

(51) Int. Cl.
*H04N 21/44* (2011.01)
*H04N 21/81* (2011.01)
*H04N 21/442* (2011.01)
*H04N 21/4402* (2011.01)
*H04N 21/845* (2011.01)

(52) U.S. Cl.
CPC ... *H04N 21/44016* (2013.01); *H04N 21/4402* (2013.01); *H04N 21/44204* (2013.01); *H04N 21/812* (2013.01); *H04N 21/8456* (2013.01)

(58) Field of Classification Search
CPC ......... H04N 21/44016; H04N 21/4402; H04N 21/44204; H04N 21/812; H04N 21/8456; H04N 21/23424; H04N 21/2353; H04N 21/2625; H04N 21/8455
See application file for complete search history.

(56) References Cited

U.S. PATENT DOCUMENTS

| 2012/0114302 | A1 | 5/2012 | Randall | |
|---|---|---|---|---|
| 2013/0125181 | A1* | 5/2013 | Montemayor | ......... H04N 21/20 |
| 2017/0180446 | A1 | 6/2017 | Thomas | |
| 2018/0192093 | A1* | 7/2018 | Loheide | ............. H04N 21/2324 |

* cited by examiner

*Primary Examiner* — Anthony Bantamoi
(74) *Attorney, Agent, or Firm* — Banner & Witcoff, Ltd.

(57) ABSTRACT

A data stream, such as a video stream, may comprise one or more event trigger messages indicating an upcoming event in the stream. The time (e.g., pre-roll time) between the event trigger message and its corresponding event may be modified, based on rules, to provide a network operator, service provider or downstream recipient more (or less) time to prepare for the event. This may be accomplished by moving the event trigger to an earlier (or later) location in the stream, and/or editing the event trigger to indicate the different pre-roll time.

20 Claims, 9 Drawing Sheets

METADATA MANIPULATION

CROSS-REFERENCE TO RELATED APPLICATIONS

The present application is a continuation of U.S. application Ser. No. 16/913,529, filed Jun. 26, 2020, the content of which is hereby incorporated by reference.

BACKGROUND

Digital video signals may contain trigger messages to indicate timing events. For example a trigger message may appear at one position in a video stream, and indicate that an event, such as a commercial break or opportunity to insert additional content, is to occur later in the stream. Timing of trigger messages may present challenges, for example, if a trigger does not provide sufficient advance notice of an event that needs to occur.

SUMMARY

The following summary presents a simplified summary of certain features. The summary is not an extensive overview and is not intended to identify key or critical elements.

Systems, apparatuses, and methods are described for modifying event trigger messages in data streams, such as video streams. A stream conditioner and/or associated computing devices may receive video content and may be configured to modify metadata including event trigger messages within the video content. The stream conditioner may receive one or more rules that indicate how metadata should be modified in the video content. The stream conditioner may modify values within an event trigger message based on a variety of factors. The stream conditioner may modify an event trigger message to increase or decrease a quantity of time between the event trigger message and its corresponding event. By increasing the time between the event trigger message and the start of an event, such as an advertisement and/or another corresponding event, more time may be given to components of one or more advertisement selection systems to determine and serve an advertisement. The stream conditioner may delete event trigger messages or insert new event trigger messages into video content.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

The accompanying drawings, which form a part hereof, show examples of the disclosure.

It is to be understood that the examples shown in the drawings and/or discussed herein are non-exclusive and that there are other examples of how the disclosure may be practiced.

Figure 1:
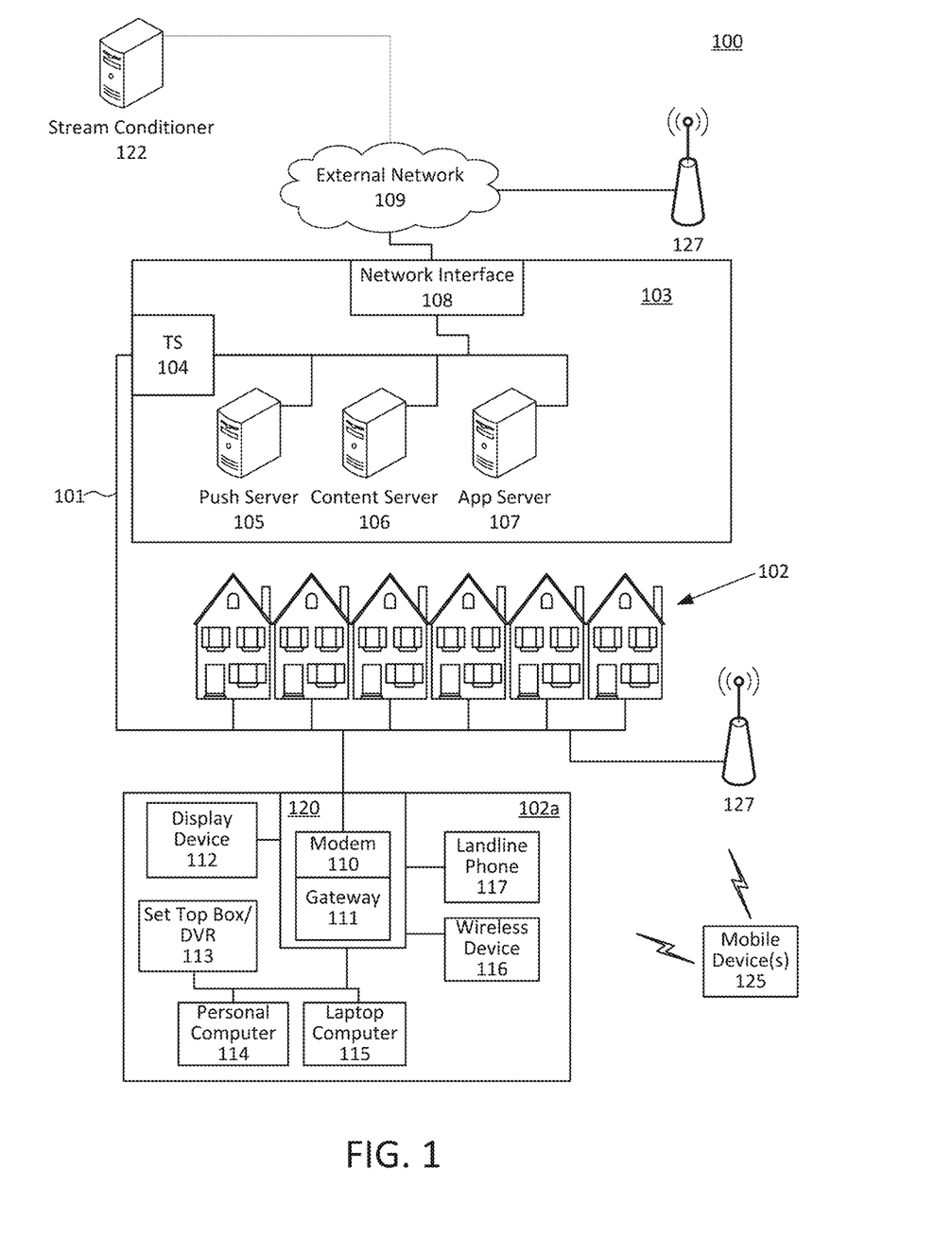
FIG. 1 shows an example communication network.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not illustrated, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smart phones, tablets or laptop computers with wireless transceivers, tablets or laptop computers communicatively coupled to other devices with wireless transceivers, and/or any other type of device configured to communicate via a wireless network.

The local office 103 may comprise an interface 104, such as a termination system (TS). The interface 104 may comprise a cable modem termination system (CMTS) and/or other computing device(s) configured to send information downstream to, and to receive information upstream from, devices communicating with the local office 103 via the communications links 101. The interface 104 may be configured to manage communications among those devices, to manage communications between those devices and back-end devices such as servers 105-107 and 122, and/or to manage communications between those devices and one or more external networks 109. The local office 103 may comprise one or more network interfaces 108 that comprise circuitry needed to communicate via the external networks 109. The external networks 109 may comprise networks of Internet devices, telephone networks, wireless networks, fiber optic networks, and/or any other desired network. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements in a video stream being transmitted to devices in the premises 102 and/or to the mobile devices 125. The local office 103 may comprise additional servers, such as additional push, content, and/or application servers, and/or other types of servers. Although shown separately, the push server 105, the content server 106, the application server 107, and/or other server(s) may be combined. The servers 105, 106, 107 and/or other servers, may be computing devices and may comprise memory storing data and also storing computer executable instructions that, when executed by one or more processors, cause the server(s) to perform steps described herein.

The stream conditioner 122, which may be located in local office 103 or (as illustrated) outside of local office 103, may receive uncompressed or compressed video from a control office or playout system. The stream conditioner 122 may include one or more video cards and may be configured to delay video (e.g., before it is sent to a local office) and manipulate video data. The stream conditioner 122 may be configured to manipulate video metadata such as event trigger messages, captioning, or any other metadata associated with the video. The stream conditioner 122 may be a computing device and may comprise memory storing data and also storing computer executable instructions that, when executed by one or more processors, cause the stream conditioner 122 to perform steps described herein.

An example premises 102*a* may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102*a* to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device.

The gateway 111 may also comprise one or more local network interfaces to communicate, via one or more local networks, with devices in the premises 102*a*. Such devices may comprise, e.g., display devices 112 (e.g., televisions), STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA)), landline phones 117 (e.g. Voice over Internet Protocol—VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102*a* may represent wired or wireless connections, as may be appropriate for the type of local network used. One or more of the devices at the premises 102*a* may be configured to provide wireless communications channels (e.g., IEEE 802.11 channels) to communicate with one or more of the mobile devices 125, which may be on- or off-premises.

The mobile devices 125, one or more of the devices in the premises 102*a*, and/or other devices may receive, store, output, and/or otherwise use assets. An asset may comprise a video, a game, one or more images, software, audio, text, webpage(s), and/or other content.

Figure 2:
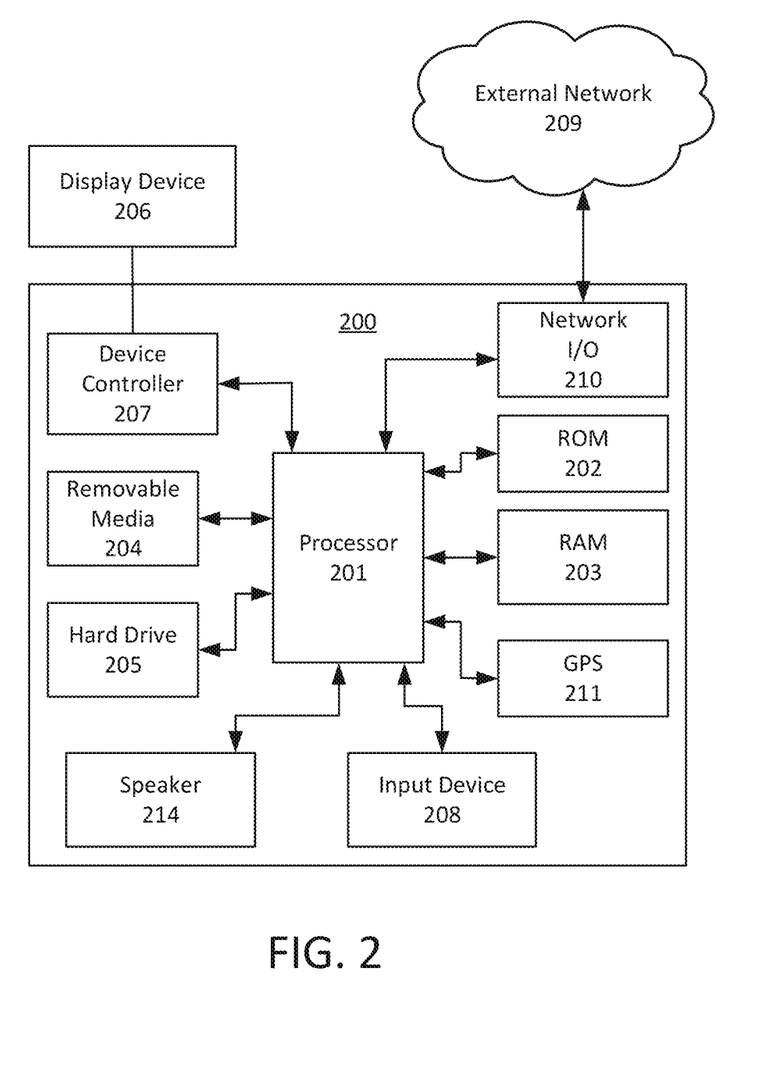
FIG. 2 shows hardware elements of a computing device.

FIG. 2 shows hardware elements of a computing device 200 that may be used to implement any of the computing devices shown in FIG. 1 (e.g., the mobile devices 125, any of the devices shown in the premises 102*a*, any of the devices shown in the local office 103, any of the wireless access points 127, any devices with the external network 109) and any other computing devices discussed herein (e.g., the stream conditioner 122). The computing device 200 may comprise one or more processors 201, which may execute instructions of a computer program to perform any of the functions described herein. The instructions may be stored in a read-only memory (ROM) 202, random access memory (RAM) 203, removable media 204 (e.g., a USB drive, a compact disk (CD), a digital versatile disk (DVD)), and/or in any other type of computer-readable medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor. One or more user input devices 208 may comprise a remote control, a keyboard, a mouse, a touch screen (which may be integrated with the display device 206), microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Figure 3A:
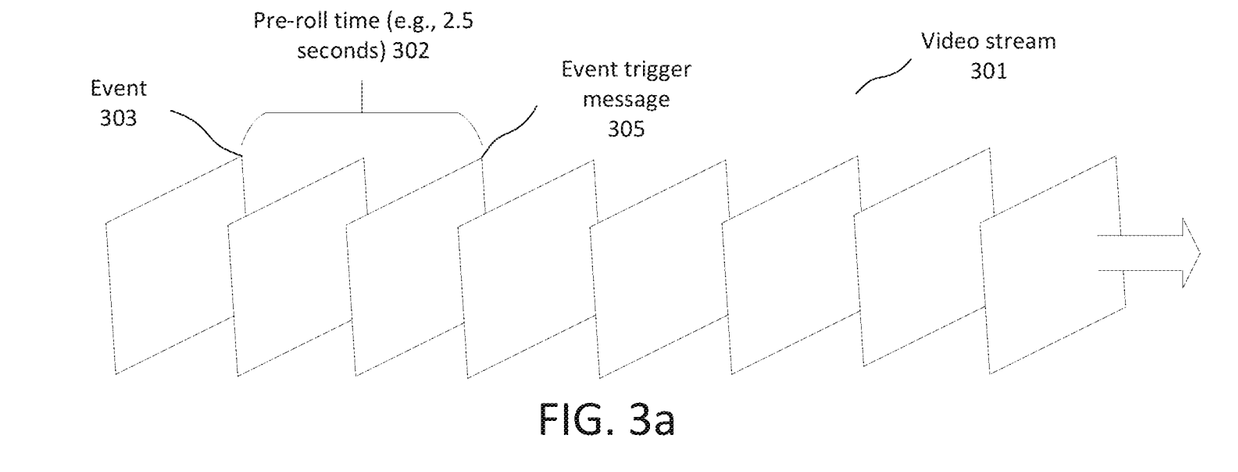
FIGS. 3a-3b show example video streams.
Figure 3B:
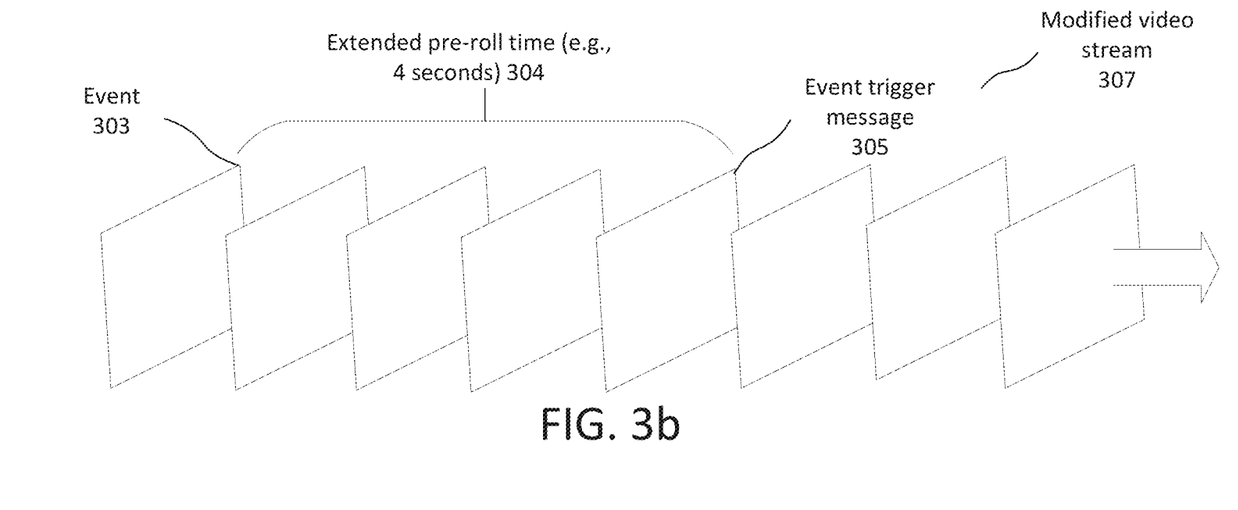

FIG. 3*a* shows an example video stream 301. The video stream 301 may be compressed or uncompressed. The video stream 301 and/or contents within the video stream 301 may follow one or more data standards (e.g., American National Standard/Society of Cable and Telecommunications Engineers 104 or 35). The video stream 301 may include a sequence of video frames and the video frames may depict video content. The video content may be any type of video content including live video content. For example, the video content may depict a sporting event, political debate, musical performance, news, etc. Although only 8 video frames are depicted in FIGS. 3*a*-3*b*, any number of video frames may exist in the video stream 301. The video stream 301 may include metadata and the metadata may be associated with a particular location within the video stream 301. The metadata, which may be encoded with the video of the video stream and/or sent in a separate data stream accompanying the video stream, may include event trigger messages, captions, subtitles, or any other type of metadata.

The video stream may include one or more event trigger messages, such as event trigger message 305, which is associated with an event 303 in the video stream 301. For example, the event 303 may be an advertisement insertion opportunity (e.g., a local advertisement may be inserted at the frame location of the event 303), and the event trigger message 305 may be embedded in an earlier frame, and may contain information indicating that the event 303 will occur within a time period (e.g., within 2 seconds, 10 seconds, 5 minutes etc.). The event trigger message 305 may have an associated pre-roll time 302 that indicates the amount of time in the video stream 301 between the event trigger message 305 and the event 303. The event trigger message 305 may include one or more fields (or headers) that indicate actions to be performed on the video stream 301. The event trigger message 305 may include a field for operation type (e.g., OpID which may include operation types such as chapter end, advertisement start, etc.). The fields in the event trigger message 305 may include a time stamp indicating a time of day the trigger was inserted into the video stream 301 or extracted from the video stream 301; a pre-roll time 302 indicating the amount of time between the trigger message and its corresponding event; and/or a field indicating a location of a resource (e.g., a location of an advertisement associated with the trigger message). Headers or fields of the event trigger message may include message size (e.g., in bytes), protocol version (e.g., SCTE 104 or SCTE 35). The fields in the event trigger message 305 may include any field described in the SCTE 104 or SCTE 35 standards. The video stream may be an Internet Protocol (IP) stream or serial digital interface (SDI) stream. The event trigger message 305 may include any field described in the Society of Motion Picture & Television Engineers (SMPTE) 2110-40 standard.

The event trigger message 305 may be used to signal opportunities for assets (e.g., advertisements, local news updates, etc.) to be inserted or replaced within the video stream 301. The event trigger message 305 may indicate that an event is nearby in the video stream 301, such as indicating that the event is 2.5 seconds later in the video stream 301. The event trigger message may indicate the type of event it is associated with (e.g., indicating an advertisement insertion opportunity, the beginning of a new chapter in a movie, etc.). The event trigger message may indicate this information using headers within the event trigger message. The event trigger message may contain an operation identification (opID) to indicate the type of event it is associated with. For example, event types may include an identification of an asset, a program start, program end, chapter start, chapter end, ad start, or ad stop. An opID may indicate a request to a device that is playing the video stream 301. For example, if the opID of an event trigger message indicates an advertisement start, the device playing the video stream 301 may play an advertisement after receiving the event trigger message.

The video stream may travel left to right (in FIGS. 3*a*-3*b*) such that the event trigger message 305 appears before the event 303. The event trigger message 305 may indicate a pre-roll time (e.g., how much time exists in the video stream 301 between the event trigger message 305 and its corresponding event 303). For example, in FIG. 3*a* the pre-roll time between the event trigger message 305 and the event 303 may be 2.5 seconds. The pre-roll time may provide operators, receiving devices, such as a local office, television station, or other content provider, with time to take actions needed to handle an upcoming event 303. For example, after a local office receives an event trigger message 305 indicating that an advertisement insertion event 303 (e.g., an opening to insert an advertisement) is occurring in 2.5 seconds, the local office may determine which advertisement to use, retrieve that advertisement, and prepare its video content devices for switching to a selected advertisement at the event 303. Unfortunately, the pre-roll time is sometimes insufficient. If the local office has slower computer processing capability, or if there is a large amount of processing needed to select the advertisement, then a larger amount of pre-roll time may be desirable. As described herein, a video stream 301 may be processed such that an event trigger message 305 is detected and moved to an earlier position in the stream 301, thereby providing a larger amount of pre-roll time.

The stream conditioner 122 may modify, delete, and/or create new event trigger messages based on rules information. The stream conditioner 122 may access information comprising one or more rules to determine whether to modify, create, and/or delete new event trigger messages. A rule may indicate an action to be performed when one or more conditions are met. Additionally or alternatively, a rule may indicate one or more values to modify within an event trigger message. A rule may indicate that if a pre-roll time (e.g., the time between a trigger message and its corresponding event) within the trigger message is below a value, the pre-roll time should be increased and the trigger message should be moved to reflect the increase in pre-roll time. For example, a rule may indicate that any trigger message with a pre-roll time below 4 seconds is modified so that the pre-roll time is 4 seconds. Increasing the pre-roll time may allow more time for actions to be performed between the trigger message and its corresponding event. For example, with increased pre-roll time, when an event trigger message for an ad is detected in the video stream 301 there may be more time for ads to be selected for an end user.

The ads may be selected by one or more different machine learning models. Each model may require a different amount of time to select the advertisement. A rule may indicate to the stream conditioner 122 how much the pre-roll time should be modified based on the machine learning model that is being used to select advertisements (e.g., the pre-roll time when a model that requires more time is being used may have a larger increase than when a model that requires less time is being used to select ads).

A rule may indicate that a universal program identification (UPID) should be modified based on whether the program is being shown for the first time or whether it is a rerun. If the UPID is modified to reflect whether a show is a rerun or not, it may be easier to identify the show as a rerun or not and ads may be better tailored for the show. For example, if an episode of a show is a rerun, less expensive advertisements may be played versus when the episode is played for the first time.

A rule may indicate to the stream conditioner 122 that it should change the pre-roll time if a previous number of event trigger messages did not have enough pre-roll time for one or more devices to perform desired actions. For example, if an action (e.g., analyzing user information to determine an advertisement for the user) to be performed by a device was not able to be completed in the pre-roll time indicated by the three previous event triggers, the pre-roll time may be increased by the stream conditioner 122 to allow more time to complete the action. A rule may indicate that one or more values should be modified when a trigger message is received at a particular time of day. Computing resource demands (e.g., on networking infrastructure) may be higher at certain times of day (e.g., from 6-10 pm when more people are watching shows). A rule may indicate to the stream conditioner 122 that a trigger message for an ad should have an increased pre-roll time during a particular time period (e.g., between 6-8 pm) so that there is more time for ads to be selected during the period when computing resources are in high demand. Alternatively, a rule may indicate that the stream conditioner 122 should increase the pre-roll time when demand rises above a threshold. For example, when demand increases, the stream conditioner 122 may receive a message indicating that 3 seconds are required to select ads for end users. In response, the stream conditioner 122 may increase the pre-roll time to 3 seconds for trigger messages corresponding to advertisements. As an additional example, a rule may indicate that if computing resource demand decreases (e.g., below a threshold) then the stream conditioner 122 should decrease the pre-roll time of an event trigger message.

A rule may indicate that an event trigger message should be moved backward in time (e.g., closer to the occurrence of the event) so that there is less delay between the event trigger message and its associated event. The event trigger message's pre-roll time may be reduced and the trigger message may be moved closer to its associated event to reduce delay in sending the video stream 301 to end users. The stream conditioner 122 may modify the operation type of a trigger message. For example, a trigger message may be changed from a chapter end operation type to an advertisement start operation type. For example, when the regular playing time of a sporting event has ended and there is a pause in action before overtime begins, the change may allow the video stream 301 to show an advertisement instead of changing to a show that was planned to start at the original expected end time of the sporting event.

A rule may indicate when a new event trigger message should be created and inserted into the video stream 301. A rule may indicate that a new event trigger message should be created and inserted into the video stream 301 when new content becomes available. For example, a rule may indicate that when new video (e.g., breaking news) becomes available, a new event trigger message should be inserted into the video stream so that the new video can be played (e.g., the new content may have a higher priority than the content that is currently playing). The stream conditioner 122 may receive a message indicating that the new video is available and may insert a new trigger message into the video stream 301 based on receiving the message. The new trigger message may indicate a location (e.g., in a field of the trigger message) for the video stream 301 to switch to so that the new content may be added to the video stream 301. The new trigger message may indicate an amount of time (e.g., 2 seconds, 4 seconds, 8 seconds, etc.) before the video stream 301 will switch to the new video. The new video may have a priority level (e.g., high, medium, low, etc.) that is indicated in a message sent to the stream conditioner 122. A rule may indicate that a new event trigger message should be inserted based on the priority level of the new video. For example, a rule may indicate that if the priority level of the new video is low, the stream conditioner 122 should not insert the trigger message into the video stream 301. By not inserting the trigger message, the new video may end up not being displayed by to an end user. A local network may only want high priority new video to be displayed to end users and may set a rule for the stream conditioner 122 to only insert new trigger messages for new video that is high priority. The priority level of a trigger message may be indicated in a field of the trigger message. Some trigger messages may be ignored based on the priority level of the trigger message (e.g., if the trigger message is low priority). For example, a local network may avoid switching to new video that is of low priority by ignoring trigger messages that are of low priority.

A rule may indicate that a new trigger message for an advertisement should be inserted into the video stream 301 when an unplanned break in a live event depicted by the video stream 301 occurs. For example, the stream conditioner 122 may analyze the video stream 301 and determine that nothing is happening (e.g., objects, people, animals, etc. are not moving in the video) and may insert a new trigger message for an advertisement to be played.

A rule may indicate in what situations an event trigger message should be deleted. For example, a rule may indicate that if two identical event trigger messages are close together (e.g., the second of the two identical event trigger messages is determined to have been added erroneously) on the video stream 301 (e.g., within 1 second, 2 seconds, 4 seconds, etc.), one of the event trigger messages should be deleted. For example, a rule may indicate that a first trigger message should be deleted if it is within a threshold distance (e.g., within 1 second, 2 seconds, etc.) of a second trigger message. A rule may indicate that trigger messages for advertisements be deleted. For example, if the video stream 301 is associated with a subscription type (e.g., intended for use by premium subscribers), a rule may indicate that the trigger messages for ads are deleted so that the subscribers are not shown any ads.

FIG. 3b shows a modified video stream 307. The video stream 301 may be modified to create the modified video stream 307. In modified video stream 307, the event trigger message 305 appears in a different location. For example, In FIG. 3b the event trigger message 305 may have been moved ahead in the modified video stream 307 to extend the pre-roll time to 4 seconds (e.g., as shown by extended pre-roll time 304).

Additionally/alternatively, the event 303 may have been moved to extend the pre-roll time to 4 seconds between the event trigger message 305 and the event trigger 303. The event and event trigger may be moved and/or manipulated before and/or after the modified video stream 307 has been encoded or transcoded. For example, the stream conditioner 122 may receive live video that has not been compressed. The stream conditioner 122 may detect and modify event trigger messages within the live video before or after it is encoded.

Figure 4:
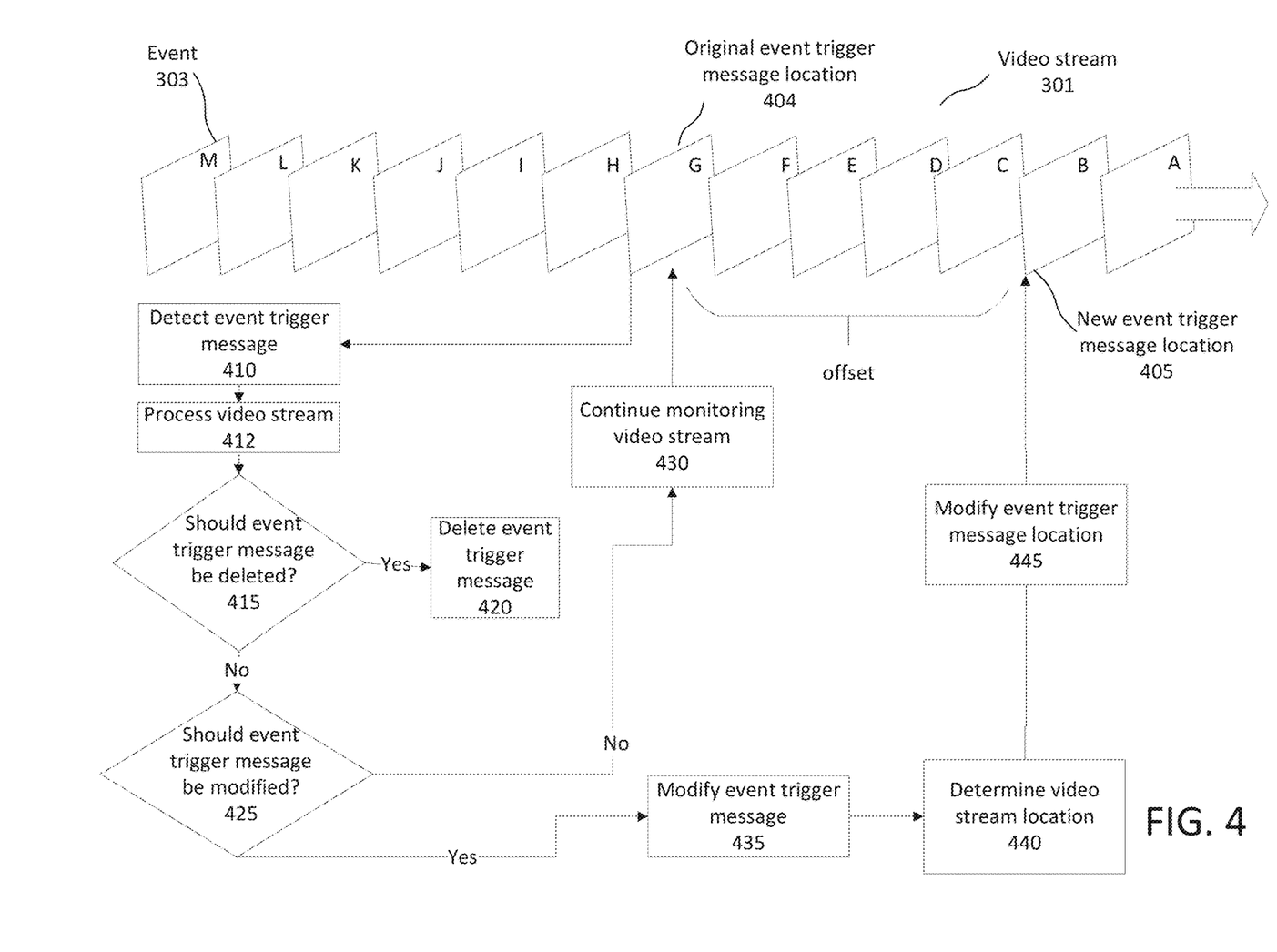
FIG. 4 shows a flow chart showing an example method for modifying event trigger messages in a video stream.

FIG. 4 shows an example method in which event trigger messages may be extracted from a video stream, modified, and placed back in the video stream at a different location to accommodate various needs. Although one or more steps of the example method of FIG. 4 are described for convenience as performed by the stream conditioner 122, one, some, or all of such steps may be performed by one or more other devices such as any device described in FIGS. 1-2. One or more steps of the example method of FIG. 4 may be rearranged, modified, repeated, and/or omitted. One or more steps of the example method of FIG. 4 may be performed before and/or after the video stream 301 is transcoded.

At step 410, an event trigger message may be detected (e.g., intercepted) in the video stream 301 (e.g., the event trigger message may be identified by a header value or field in metadata associated with the video stream 301 or a video frame within the video stream 301). A detected event trigger message may be automatically removed from the video stream 301 (e.g., to be re-inserted later at the same or different frame position, or completely set aside if the trigger is not needed). A detected event trigger message may need to be removed from the video stream to analyze it and determine whether it should be deleted, modified, or moved as discussed in further detail below. The stream conditioner 122 may extract the event trigger message from the video stream by rewriting metadata so that it no longer contains the trigger. Alternatively, the event trigger message may be analyzed without removing the event trigger message from the stream. For example, information within the event trigger message may be accessed by the stream conditioner 122. A copy of the event trigger message may be made or otherwise accessed without removing the event trigger message from the video stream 301. For example, data within the event trigger message may be analyzed (e.g., a determination may be made whether the message should be deleted, modified, or moved) without removing the event trigger message from the video stream, and it may be determined that the event trigger message may remain at its current location. Some or all event trigger messages may be intercepted from the video stream 301. For example, the stream conditioner may look for certain triggers that it can process (an advertisement trigger insertion process might only look for event triggers indicating an advertisement insertion opportunity, and might ignore other types such as chapter markers).

At step 412, the video stream 301 may be delayed or otherwise processed. For example, the video stream may be delayed by the stream conditioner 122 for a number of seconds (e.g., 1, 3, 4, 7, etc.). The delay may allow content (e.g., event trigger messages) within the video stream 301 to be moved and/or changed. For example, a portion (e.g., 3, 6, 15, or 60 seconds) of the video stream may be stored in a buffer. By storing a portion of the video stream 301 in a buffer, a computing device (e.g., the stream conditioner 122) may be able to move or insert a trigger message earlier in the video stream. For example, if an event trigger message is found at frame G of FIG. 4, but needs to be moved to frame B, the stream conditioner 122 may store frames B-G in a buffer so that it can move the event trigger message in front of frame B. Delaying the video stream 301 is one implementation and is optional. The method of FIG. 4 may be performed without delaying the video stream 301. For example, the event trigger message may be modified or deleted without delaying the video stream 301.

At step 415, a determination may be made as to whether the event trigger message detected and/or intercepted in step 410 should be deleted. The determination may be made based on one or more rules set by a user and received by the stream conditioner 122. For example, a user may send instructions to the stream conditioner 122 that the event trigger message be deleted. The event trigger message may be deleted to prevent advertisements from playing. For example, for premium subscribers, the stream conditioner 122 may remove event trigger messages from the video stream 301. Event trigger messages may be deleted based on the content of a live video stream. For example, the stream conditioner 122 may use scene detection algorithms to determine an exciting moment (e.g., based on a volume level of the audience exceeding a threshold in the video). An external device may analyze the video stream using machine learning and/or artificial intelligence to determine an exciting moment and then decide if an event trigger should be deleted or moved. The external device may send an event manipulation signal to the stream conditioner which may then insert, modify, or delete an event trigger message. If there is an exciting moment, then an event trigger for an ad may be deleted (or moved to a different location) so the exciting moment is not interrupted by an advertisement.

An event trigger message may also be deleted if the event trigger message was mistakenly placed in the video stream 301. For example, an operator may mistakenly place an event trigger in the video stream 301. The stream conditioner 122 may determine that an event trigger was mistakenly placed in the video stream 301 and may delete the event trigger message. The stream conditioner 122 may determine that an event trigger was mistakenly placed in the video stream 301 if it is too close (e.g., within a time threshold) to another event trigger message. For example, if there are two event trigger messages that are within a second of each other and/or they have the same values (e.g., they are both triggers indicating events for the same advertisement), then the stream conditioner 122 may delete one of the event trigger messages.

If it is determined that the event trigger message should be deleted, then in step 420 the event trigger message may be deleted. Any type of event trigger message may be deleted. For example, an event trigger message that indicates a chapter or program end may be deleted. If a live program is going to continue beyond its expected ending time, the stream conditioner 122 may delete a chapter or program end trigger message from the video stream 301 to prevent the video stream from switching from the live program to a different program. For example, the stream conditioner 122 may receive a rule that indicates if a breaking news event extends longer than expected, one or more chapter or program end trigger messages should be deleted. The stream conditioner 122 may receive an indication that the breaking news event has gone into overtime and may delete one or more chapter or program end trigger messages from the video stream 301 to make sure that the breaking news video is not interrupted. After the event trigger message is deleted in step 420, the method may be repeated from step 410. If it is determined that the event trigger message should not be deleted (e.g., no rules instructing the stream conditioner 122 to delete the event trigger message have been received), step 425 may be performed.

At step 425, a determination may be made as to whether the event trigger message should be moved and/or changed. The determination may be made, for example, based on one or more rules set by a user (e.g., advertisement system operators who may determine whether or not a longer delay is needed) and received by the stream conditioner 122. The stream conditioner 122 may access one or more rules and/or event trigger message information to determine whether the event trigger message should be moved and/or changed. For example, the event trigger message may be moved and/or changed because a downstream system, computing device, and/or user may need more time to determine what advertisement to insert. The rules may indicate that a trigger message should be modified based on a value contained in the trigger. For example, the rules may indicate that a trigger message for an advertisement insertion should provide at least 4 seconds of time (e.g., the minimum threshold pre-roll time) between the trigger and the corresponding advertisement insertion event. If an incoming advertisement insertion trigger is received, but provides less than the threshold amount of time, then the trigger may be moved to an earlier time in the stream (to increase the time between the trigger and its corresponding event), and the trigger message itself may be modified to indicate the new pre-roll time (e.g., a pre-roll time field in the trigger may be modified to reflect the new pre-roll time). The amount of change to the pre-roll time may be referred to as an offset time. For example, there may be a 4000 ms threshold for a pre-roll time field. If the pre-roll time field in a trigger message is below the threshold, for example the value in the field is 1000 ms, then the field can be changed from 1000 ms to 4000 ms. In this example the offset value would be 3000 ms.

The rules may indicate actions to perform when one or more values within the trigger message match criteria. For example, the stream conditioner 122 may receive instructions to modify a universal program identification (UPID) value of a trigger message based on a time of day that a particular UPID value is received by the stream conditioner. For example, a first episode of a TV show may have a trigger message indicating a first UPID value and the first episode may be shown at a premiere and then again in subsequent reruns. The stream conditioner 122 may receive instructions to modify the UPID so that the UPID also indicates an airing time of the first episode so that the UPID of the premiere is different from the UPID of the subsequent reruns. For example, the UPID value in the trigger of an episode airing Sunday night for the first time may be modified differently from a rerun of the same episode that is played later on Monday afternoon. Modifying the UPID of the first episode based on the airing time of the first episode may allow different advertisements to be used for the episode depending on when the episode is played or whether the episode is a rerun. If the episode is playing for the first time (it is a premiere), then advertisements targeting a particular audience may be selected or the advertisements may cost more.

If it is determined that the event trigger message should not be moved and/or changed (e.g., the event trigger message does not match criteria received from an operating system, or user), step 430 may be performed. At step 430, the video stream 301 may be monitored. For example, the video stream may be monitored for additional trigger messages (e.g., any of steps 410-440 may be repeated). For example, if the event trigger message was not removed from the video stream 301 (e.g., in step 410) and/or it was determined that the event trigger message did not need to be moved, the stream conditioner 122 may continue to monitor the video stream 301. Alternatively, the event trigger message may be reinserted at the event trigger message's original location 404 within the video stream 301 (e.g., if the event trigger message was removed in step 410).

If it is determined that the event trigger message should be moved and/or changed, step 435 may be performed. At step 435, the event trigger message may be modified. Any portion of the event trigger message may be modified. For example, a rule may indicate that an advertisement (ad) insertion trigger should provide at least 4 seconds of pre-roll time before the corresponding ad insertion opportunity, to give a downstream operator/system/user at least 4 seconds to prepare for inserting an ad at the ad insertion opportunity. If, in step 410, a received ad insertion trigger provides less than that threshold amount of pre-roll time, then the trigger may be moved to an earlier location in the stream, and modified to indicate the new pre-roll time. For example, an incoming ad insertion trigger having a pre-roll time of only 1 second may be moved to an earlier position by 3 seconds, so that a total of 4 seconds will exist between the trigger and its corresponding event (the ad insertion opportunity). As an additional example, an event trigger message may be associated with frame G of FIG. 4 and may have a pre-roll time of 100 ms (e.g., the time between the message and the event associated with the message is 100 ms). The event trigger message may be moved so that it is associated with frame B and the pre-roll time of the event trigger message may be changed to 600 ms. Increasing the pre-roll time may allow more time to choose a video to display for the event associated with the event trigger message.

Modifying the event trigger message may include accessing and/or updating data within the message, for example, if the message is seen within a time period or outside of a time period (e.g., during primetime, during the morning hours when people are getting ready for work, when video demand is high, etc.). For example, if the intercepted event trigger message from step 410 is part of a video stream that is received during primetime (e.g., 6-10 pm), the event trigger message may be modified (e.g., to allow for more time for processing between the trigger and the event). As an additional example, if the intercepted event trigger message from step 410 is part of a video stream that is received during a period when demand for video satisfies a threshold, the event trigger message may be modified and/or moved. For example, if demand for video is high (e.g., during primetime, during a popular sporting event, etc.), the event trigger message for an advertisement start may be moved earlier in the video stream to allow more time to determine an advertisement. If demand for video is low, the event trigger message may be moved later in the stream closer to the event because less time is needed to determine an event or details corresponding to an event.

Modifying the event trigger message may include changing one or more values in the event trigger message. For example, Stream conditioner 122 may change the pre-roll time of the event trigger message. This may cause the event trigger message to be inserted into an earlier location within the video stream 301. If the event trigger message is for an advertisement, increasing the pre-roll time of the event trigger message may allow more time for a computing device or user to determine an advertisement for one or more viewers of the video stream 301. For example, various models (e.g., machine learning models) may be used to predict or select an advertisement to use for one or more viewers of the video content. Some models may require more processing time to select an advertisement than other models. The stream conditioner 122 may move an event trigger message and/or increase the pre-roll time of the event trigger message to allow more time for a more time intensive model to select an advertisement. For some models that need less time, the stream conditioner 122 may reduce the pre-roll time of the event trigger message.

An event trigger message may indicate that content is ending. Modifying the event trigger message may cause the event trigger message to indicate that an advertisement will begin instead of content ending. For example, the video stream 301 may include a sporting event that goes into overtime. An event trigger message that was originally intended to trigger a change to a different video stream (e.g., a show or program that is to follow the sporting event) may be replaced with an event trigger message that triggers an advertisement to be displayed. This may allow an advertisement to be played instead of a show at the original end time of the sporting event. After the advertisement is over, the overtime portion of the sporting event may be shown in video stream 301. A commercial break that was planned for the originally scheduled end time might need to be delayed, so the existing triggers may need to be removed and replaced with new (or identical) triggers at a point later in the video stream 301 (e.g., after the sporting event ends). For example, a baseball game may extend past an expected end time and a trigger message for an advertisement that was planned to be played at the expected end time may need to be moved to a later point in the video stream.

At step 440, a video stream location for insertion of the event trigger message may be determined. For example, the stream conditioner 122 may calculate an offset value that is equal to the difference between an old pre-roll time and a new pre-roll time of the event trigger message. For example, if an event trigger message has a pre-roll time of 1000 ms, and the stream conditioner 122 modifies the event trigger message to have a new pre-roll time of 4000 ms, the stream conditioner 122 may determine that the offset (e.g., offset in FIG. 4) value should be equal to 3000 ms. The stream conditioner 122 may determine to change the pre-roll time if the pre-roll time is below a predetermined amount of time (e.g., if the pre-roll time is below 2 seconds, 4 seconds, etc.).

At step 445, the event trigger message may be inserted into a new event trigger message location 405 (e.g., at frame C, at frame B, etc.) within the video stream 301. The new location within the video stream 301 may be the original location minus the offset value determined in step 440. For example, if the offset value determined in step 440 is three seconds, the event trigger message may be inserted three seconds earlier (closer to the beginning of the video stream 301) than the original event trigger message location 404.

Figure 5:
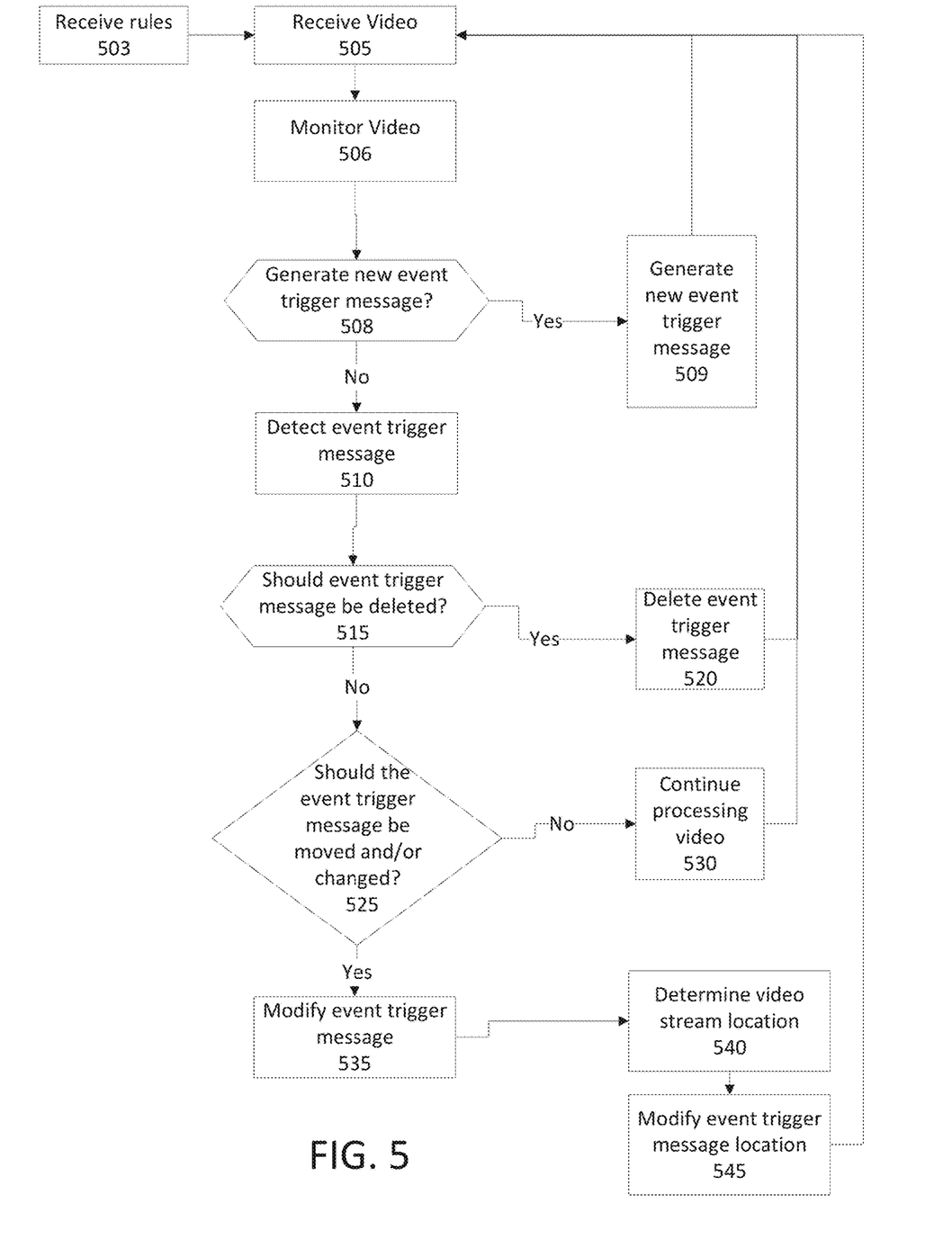
FIG. 5 shows a flow chart showing an example method for modifying event trigger messages in a video stream.

FIG. 5 shows an additional example method for monitoring and modifying event trigger messages. Although one or more steps of the example method of FIG. 5 are described for convenience as performed by the stream conditioner 122, one, some, or all of such steps may be performed by one or more other devices such as any device described in FIGS. 1-2. One or more steps of the example method of FIG. 5 may be rearranged, modified, repeated, and/or omitted. One or more steps of the example method of FIG. 5 may be performed before or after a video stream (e.g., video stream 301) is encoded or transcoded.

At step 503, the stream conditioner 122 may receive one or more rules for modifying, deleting, and/or creating new trigger messages as described above in connection with FIG. 3. The one or more rules may be input by a user and/or received from a computing device. At step 505, the video stream 301 may be received by the stream conditioner 122. For example, portions (e.g., 30 MB, 100 MB, 1 GB, 1 petabyte, etc.) of the video stream 301 may be received periodically (e.g., every 500 ms, every second, every 2 seconds, etc.). Portions of the video stream 301 may be stored in a buffer for further processing as described below. The stream conditioner 122 may receive the video from a control room, a playback system, or any other computing device. The video stream 301 may be uncompressed or compressed video. For example, the video stream 301 may be uncompressed live video received from a control center where the video stream 301 is being recorded. At step 506, the video stream 301 may be delayed and monitored. The video stream 301 may be delayed as discussed above in connection with step 412 of FIG. 4.

At step 508, a determination may be made as to whether a new event trigger message should be inserted. A new event trigger message may be inserted at any location of a portion of the video stream 301 that is stored in a buffer. For example, the stream conditioner 122 may determine to insert a new event trigger message into video stream 301 based on one or more rules described above in connection with FIG. 3, or if it receives instructions to do so from a user. The stream conditioner 122 may determine to insert a new event trigger message when new content becomes available. For example, the stream conditioner 122 may receive a message indicating that new content is available and may insert a new trigger message into the video stream 301. If it is determined that a new event trigger message should be inserted, step 509 may be performed and a new event trigger message may be generated (e.g., by the stream conditioner 122) and inserted into the video stream 301. For example, the stream conditioner 122 may insert the event trigger message at a location within the video stream 301 (e.g., at a particular time stamp) determined by a user. A new event trigger message may be inserted when new content becomes available for viewing. For example, when breaking news becomes available to view, the stream conditioner 122 may insert an event trigger message that allows video to switch from what is currently playing to the breaking news video. A new event trigger message may be inserted into the video stream 301 based on a priority level associated with new content. For example, if the breaking news is at a top priority level, then a new event trigger message may be inserted into the video stream 301.

Figure 6:
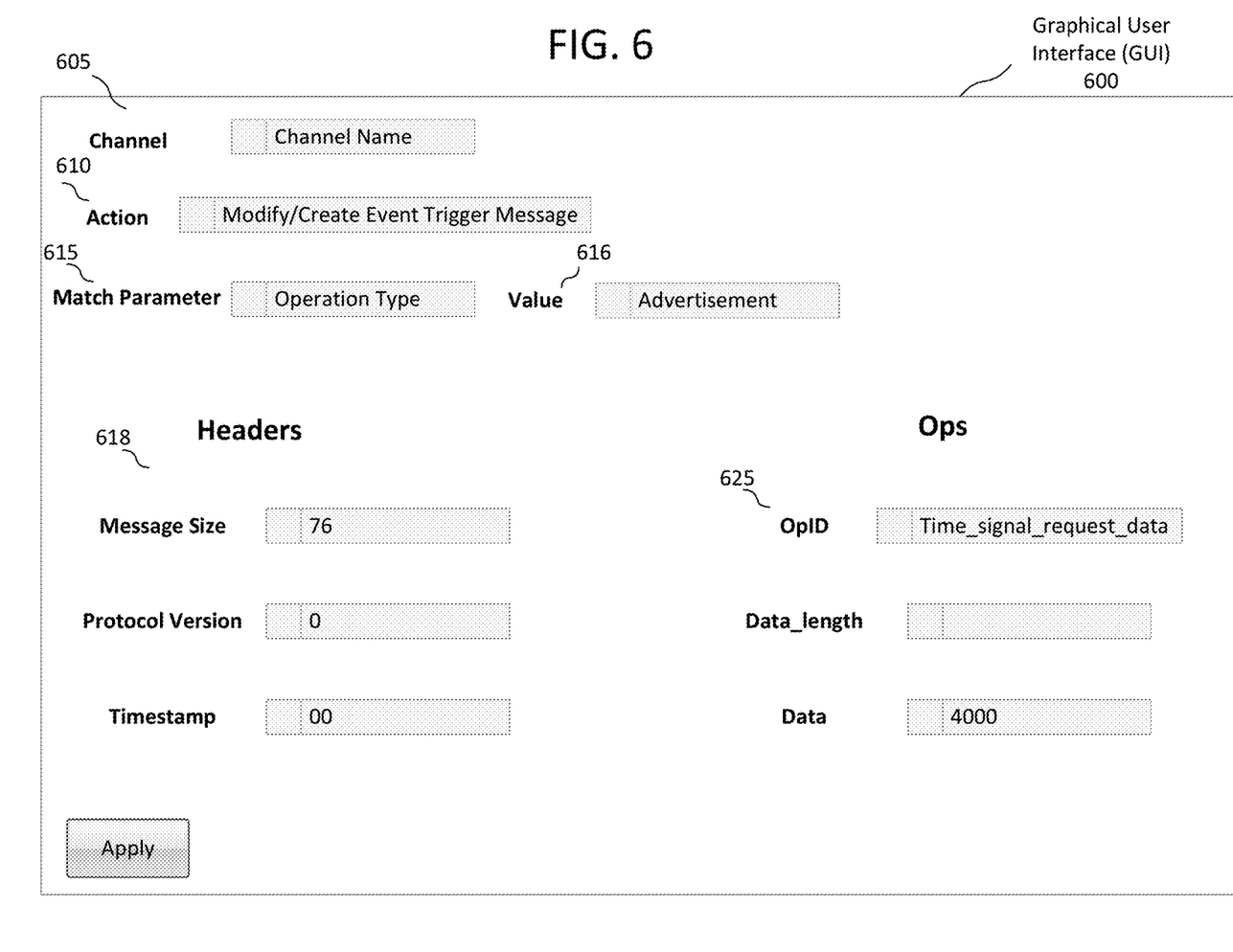
FIG. 6 shows an example graphical user interface for modifying or creating an event trigger message.

If the breaking news is at a low priority level, the new event trigger message may be inserted into the video stream 301 if the settings set by the local office 103 allow for the event trigger message to be inserted. A user may use GUI 600 to specify values for headers and ops to create a new event trigger message. A user may specify the location within the video stream 301 where the new event trigger message is to be inserted.

At step 510, an event trigger message may be detected (e.g., intercepted) as described above in connection with step 410 of FIG. 4. For example, each portion of the video stream 301 that is stored in a buffer (as described above in connection with step 505) may be analyzed to determine whether an event trigger message is contained within the portion. If an event trigger message is found in the portion of the video stream 301, the stream conditioner 122 may extract it. Alternatively, information contained in the event trigger message may be accessed without extracting the event trigger message. At step 515, whether the event trigger intercepted in step 510 should be deleted may be determined as discussed above in step 415 of FIG. 4. If it is determined that the event trigger message should be deleted, in step 520 the event trigger message may be deleted and the stream conditioner 122 may return to step 505. If it is determined that the event trigger message should not be deleted then step 525 may be performed.

At step 525, whether the event trigger message should be moved and/or changed may be determined as described in step 425 of FIG. 4. If it is determined that the event trigger message should not be moved and/or changed (e.g., the event trigger message does not match search criteria from a user), step 530 may be performed. At step 530, the stream conditioner 122 may continue processing video. For example, the stream conditioner 122 may reinsert the event trigger message into its original location within the video stream 301, as described in connection with step 430 of FIG. 4. If it is determined that the event trigger message should be moved and/or changed, step 535 may be performed. At step 535, the event trigger message may be modified as described in connection with step 435 of FIG. 4. For example, the stream conditioner 122 may access information (e.g., rules for modifying event trigger messages) to determine a modification for the event trigger message.

At step 540, a video stream location for insertion of the event trigger message may be determined as described in connection with step 440 of FIG. 4. At step 545, the event trigger message may be inserted into a new event trigger message location as described in connection with step 445 of FIG. 4. Steps 505-545 may be repeated for the duration of the video content.

FIG. 6 shows an example user interface (UI) for modifying or creating an event trigger message. A user may use a GUI such as example GUI 600 to instruct the stream conditioner 122 to change and/or move an event trigger message. For example, the stream conditioner 122 may compare the event trigger message intercepted in step 410 with instructions received from a user to determine whether the event trigger message should be moved and/or changed. A user may select a channel 605, action 610, match parameter 615, and value 616. If the event trigger message intercepted in step 410 of FIG. 4 or step 510 of FIG. 5 matches the match parameter 615 and value 616, and if the action 610 is "modify trigger message," the stream conditioner 122 may modify and/or move the event trigger message.

One or more OpIDs (e.g., OpID 625) and their associated values in the event trigger message may be modified. Values corresponding to OpID's such as time signal request data, insert segmentation descriptor request data, and/or the insert time descriptor may be modified as indicated by a user. For example, the time signal request data OpID's values for data length and data may be modified. Modifying values within an event trigger message may shorten or extend the pre-roll time of the event trigger message.

Figure 7:
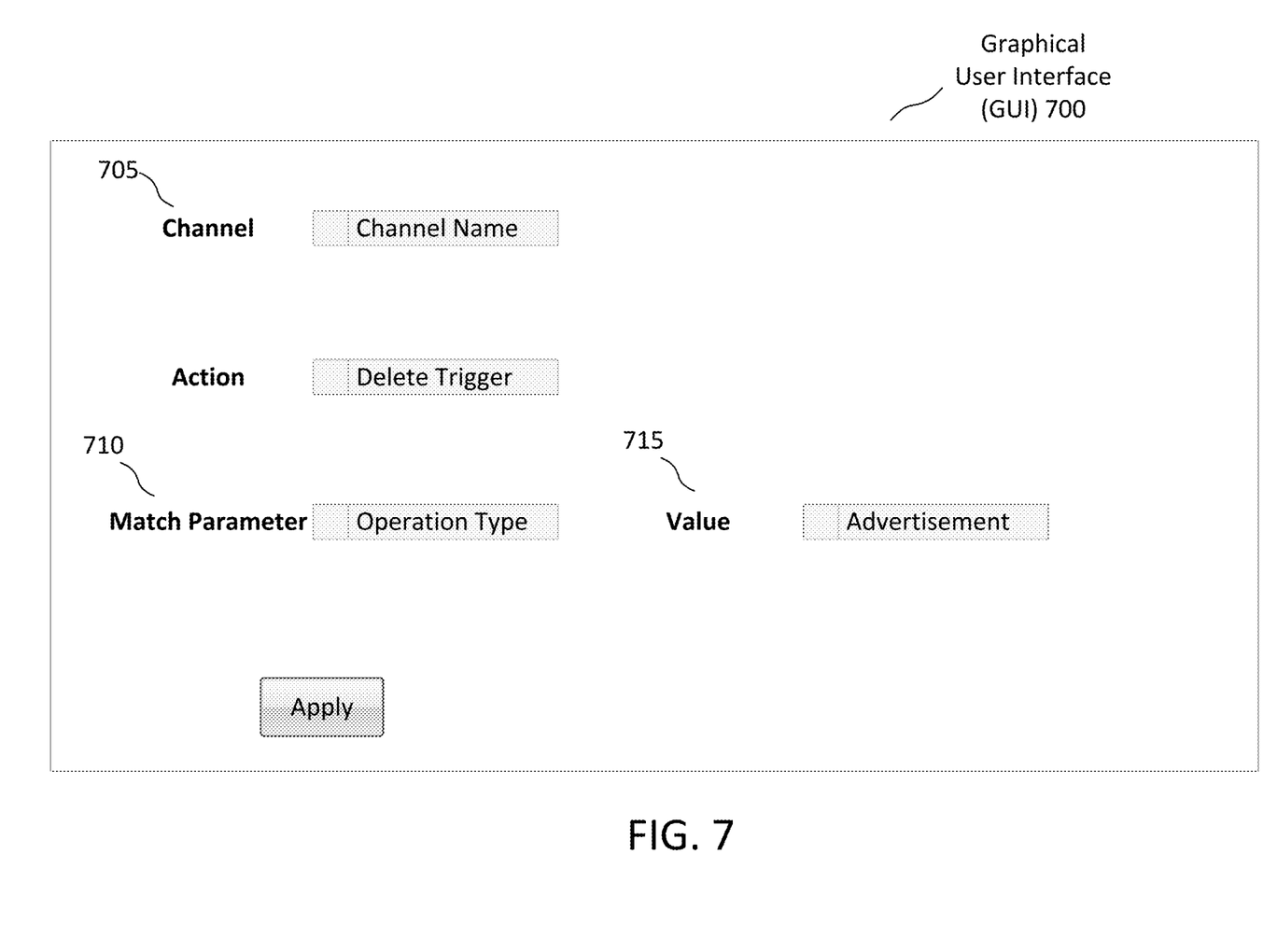
FIG. 7 shows an example graphical user interface for deleting an event trigger message.

A user may use the example GUI shown in FIG. 7 to delete an event trigger message. A user may use GUI 700 to select a channel 705 from which to delete an event trigger message. A user may input a match parameter 710 to indicate which event trigger messages should be deleted. For example, the user may select "operation type" as the match parameter 710 and "Advertisement" as the value 715. As a result, any event trigger message that corresponds to an advertisement may be deleted.

Figure 8:
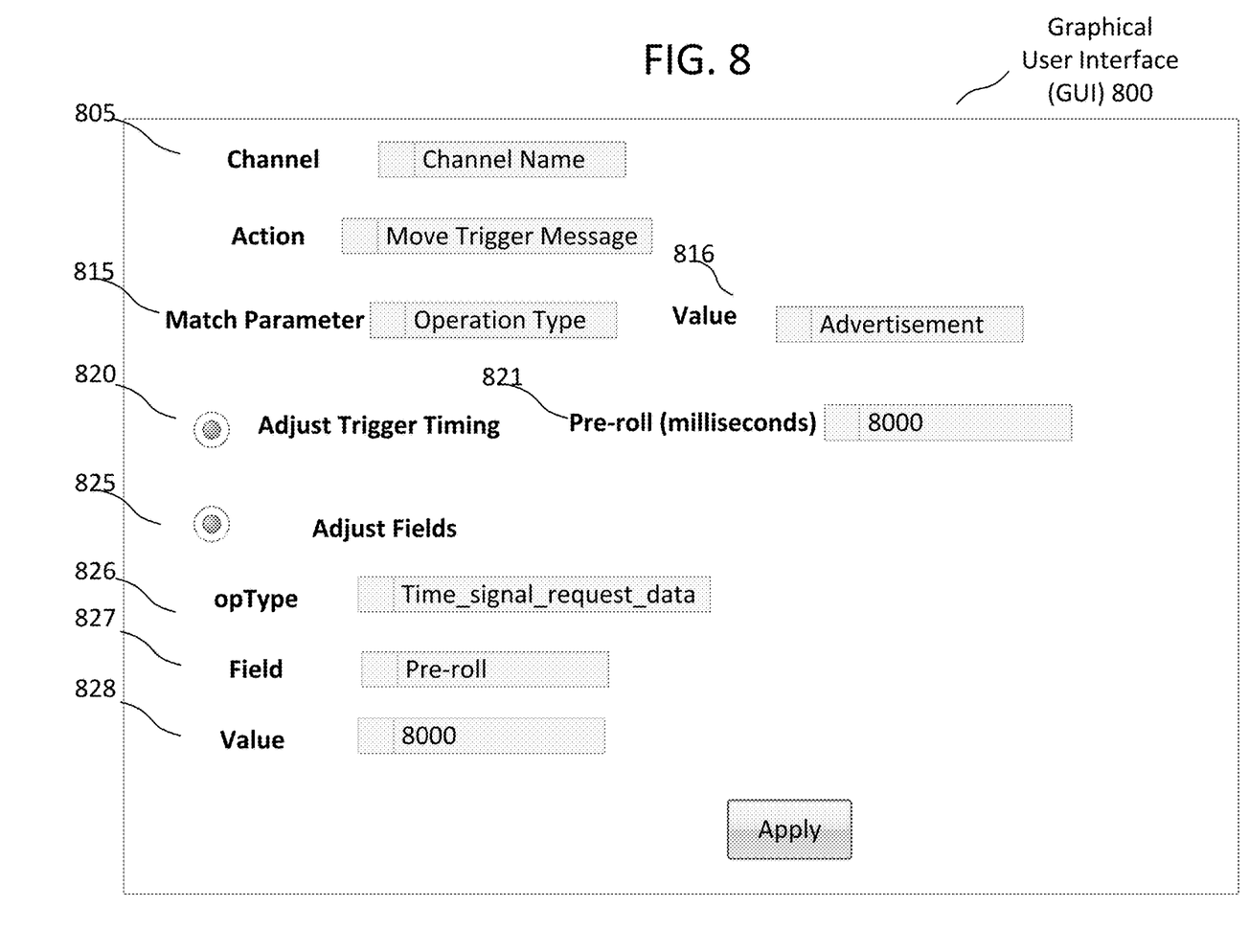
FIG. 8 shows an example graphical user interface for moving an event trigger message.

Example GUI 800 may be used to set the new pre-roll time of an event trigger message.

As shown in FIG. 8, a user may select a channel 805, a match parameter 815, and a value 816 for the match parameter 815 to specify which event trigger messages should be moved. Radio button 820 may be used to select whether the event trigger message should be moved. The pre-roll field 821 may be used to indicate the new pre-roll time of the event trigger message and may be used to determine the offset value discussed in step 440 of FIG. 4 and/or step 540 of FIG. 5. The radio button 825 may be used to indicate whether any fields in the event trigger message should be changed. For example, opType 826, field 827 (e.g., pre-roll), and value 828 may be changed within the event trigger message. The value 828 may be the new value that is applied to the field 827. For example, if the field 827 is pre-roll and the value 828 is 8000 ms, the pre-roll time field within the event trigger message may be changed to 8000 ms.

Figure 9:
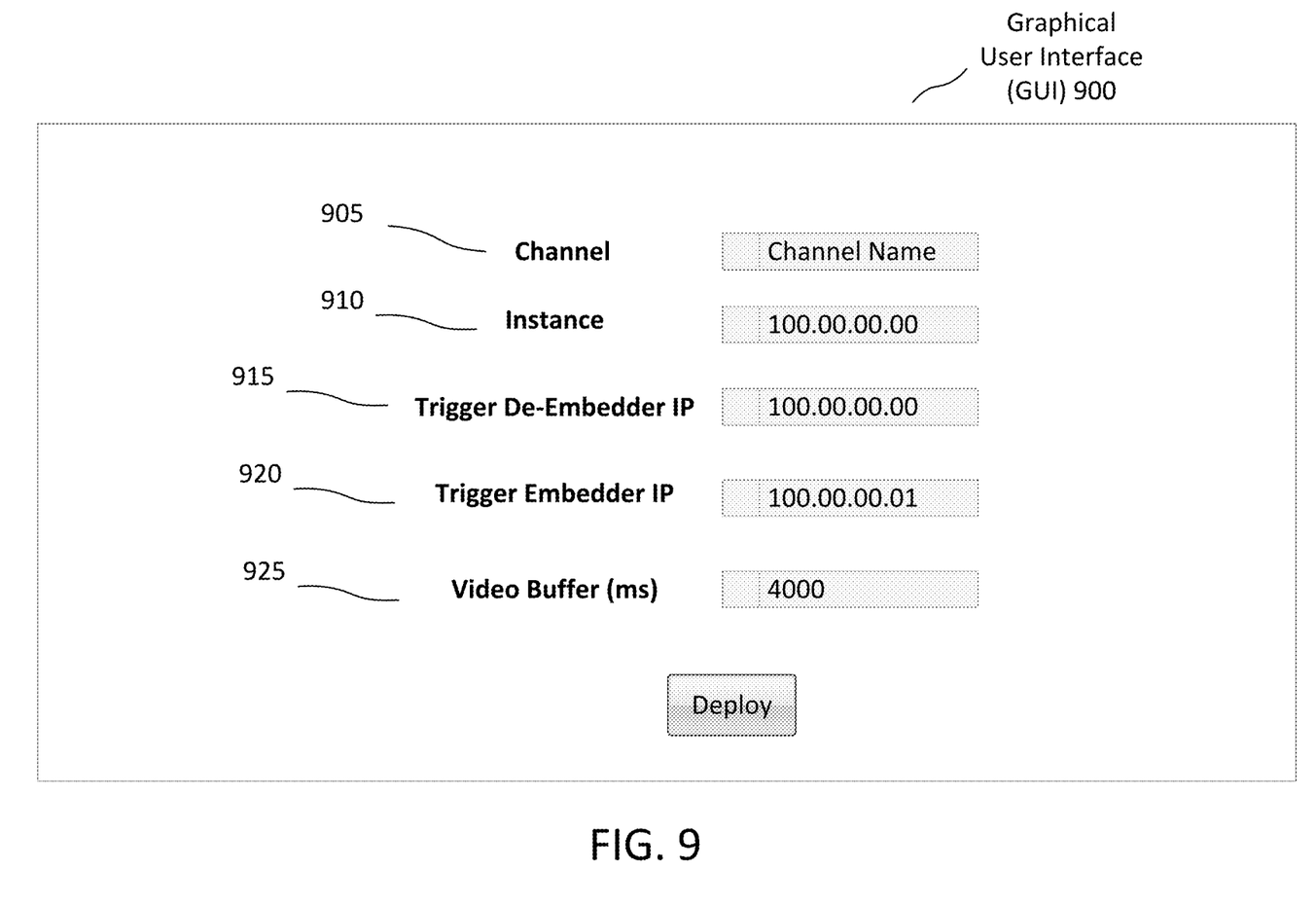
FIG. 9 shows an example graphical user interface for configuring a trigger manipulation system.

A user may use GUI 900 to configure a system (e.g., the stream conditioner 122) to manipulate event trigger messages within a video stream. As shown in FIG. 9, GUI 900 may be used to deploy a system for performing the example method of FIG. 4 and/or FIG. 5. The system may include the stream conditioner 122. The system may include a trigger de-embedder and a trigger embedder, both of which may be part of the stream conditioner 122. The trigger de-embedder may be used to extract event trigger messages from the video stream 301. The trigger embedder may be used to insert event trigger messages into the video stream 301. A user may specify a channel 905, an instance Internet Protocol (IP) address 910, a trigger de-embedder IP address 915, a trigger embedder IP address 920, and a video buffer 925 (e.g., which may indicate an amount of time to delay the video stream 301). The video stream 301 may be delayed by the amount of time specified in video buffer 925. Some or all of the video stream may be saved in memory (e.g., a buffer). The video stream 301 may be delayed for any amount of time (e.g., 4 seconds, 30 seconds, five minutes, etc.).

Although examples are described above, features and/or steps of those examples may be combined, divided, omitted, rearranged, repeated, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
receiving video content comprising at least a first event trigger message at a first location;
accessing information corresponding to event trigger messages, wherein the information comprises pre-roll time information for event trigger messages;
moving, based on the pre-roll time information, the first event trigger message to a different location within the video content; and
removing, based on the information, a second event trigger message from the video content.

2. A method comprising:
receiving video content comprising at least a first event trigger message at a first location;
accessing information corresponding to event trigger messages, wherein the information comprises pre-roll time information for event trigger messages;
based on determining that a distance between the pre-roll time information and an insertion point satisfies a threshold, moving the first event trigger message to a different location within the video content.

3. The method of claim 1, wherein the information corresponding to event trigger messages indicates, for each of a plurality of event trigger message types, a different threshold pre-roll time.

4. The method of claim 1, wherein the moving comprises increasing an amount of time between the first event trigger message and an advertisement associated with the first event trigger message.

5. The method of claim 1, further comprising:
inserting, within the video content and after the first event trigger message, an advertisement.

6. The method of claim 1, further comprising:
inserting, based on a priority level of new content, a third event trigger message into the video content.

7. The method of claim 1, further comprising modifying, based on a determination that a resource demand has satisfied a threshold, a pre-roll time of the first event trigger message.

8. The method of claim 2, wherein the threshold comprises a minimum amount of time to act on the insertion point.

9. The method of claim 2, wherein the information corresponding to event trigger messages indicates, for each of a plurality of event trigger message types, a different threshold pre-roll time.

10. The method of claim 2, wherein the moving comprises increasing an amount of time between the first event trigger message and an advertisement associated with the first event trigger message.

11. The method of claim 2, further comprising:
inserting, within the video content and after the first event trigger message, an advertisement.

12. The method of claim 2, further comprising:
inserting, based on a priority level of new content, a third event trigger message into the video content.

13. The method of claim 2, further comprising modifying, based on a determination that a resource demand has satisfied a threshold, a pre-roll time of the first event trigger message.

14. A method comprising:
receiving video content comprising at least a first event trigger message at a first location;
accessing information corresponding to event trigger messages, wherein the information comprises pre-roll time information for event trigger messages;
determining, based on the pre-roll time information, to move the first event trigger message to a threshold distance from an insertion point associated with the video content; and
moving the first event trigger message to the threshold distance.

15. The method of claim 14, wherein the information corresponding to event trigger messages indicates, for each of a plurality of event trigger message types, a different threshold pre-roll time.

16. The method of claim 14, wherein the moving comprises increasing an amount of time between the first event trigger message and an advertisement associated with the first event trigger message.

17. The method of claim 14, further comprising:
inserting, within the video content and after the first event trigger message, an advertisement.

18. The method of claim 14, further comprising:
inserting, based on a priority level of new content, a third event trigger message into the video content.

19. The method of claim 14, further comprising modifying, based on a determination that a resource demand has satisfied a threshold, a pre-roll time of the first event trigger message.

20. The method of claim 14, further comprising removing, based on the information corresponding to event trigger messages, a second event trigger message from the video content.

* * * * *

UNITED STATES PATENT AND TRADEMARK OFFICE
CERTIFICATE OF CORRECTION

PATENT NO. : 11,671,655 B2
APPLICATION NO. : 17/536614
DATED : June 6, 2023
INVENTOR(S) : Franz et al.

Page 1 of 1

It is certified that error appears in the above-identified patent and that said Letters Patent is hereby corrected as shown below:

In the Specification

Column 2, Detailed Description, Line 7:
After "discloser.", delete "¶"

Column 9, Detailed Description, Line 22:
After "304).", delete "¶"

Column 9, Detailed Description, Line 25:
After "event", delete "trigger"

Column 16, Detailed Description, Line 19:
After "message.", delete "¶"

In the Claims

Column 17, Line 19:
In Claim 2, after "messages;", insert --and-- therefor

Signed and Sealed this
Twenty-fourth Day of September, 2024

Katherine Kelly Vidal
*Director of the United States Patent and Trademark Office*